Nov. 10, 1931. L. B. MOORHOUSE 1,831,788
APPARATUS FOR GENERATING WATER GAS
Filed Jan. 24, 1928  6 Sheets-Sheet 3
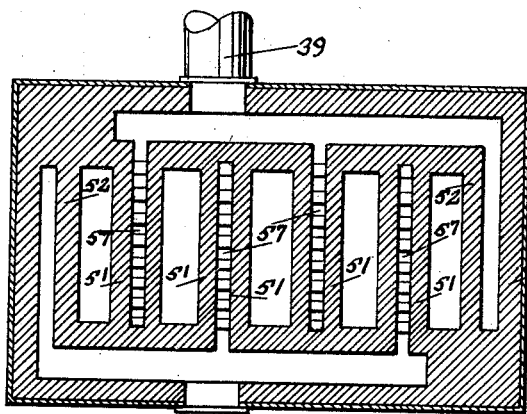
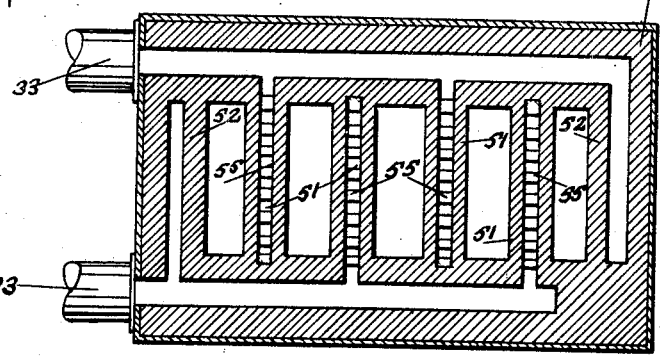
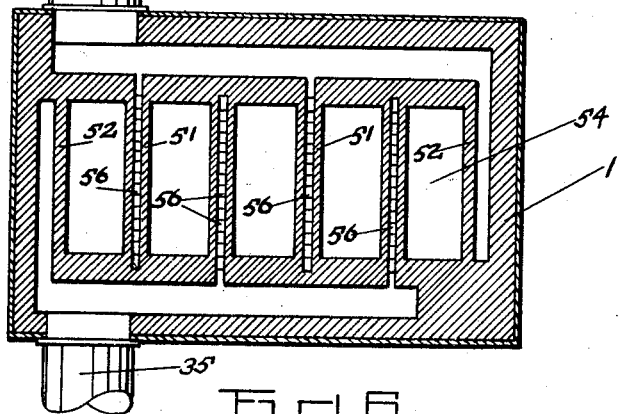

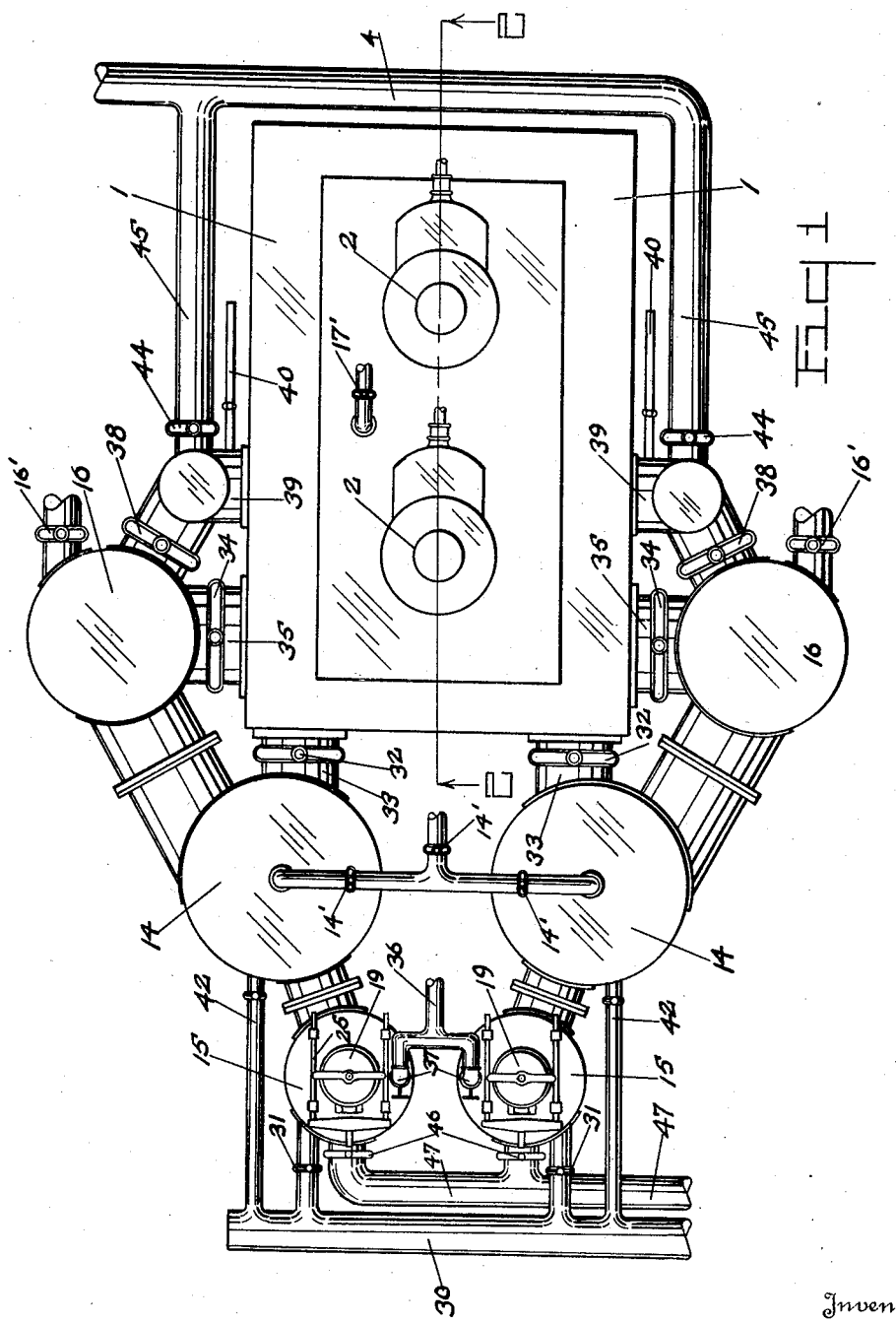

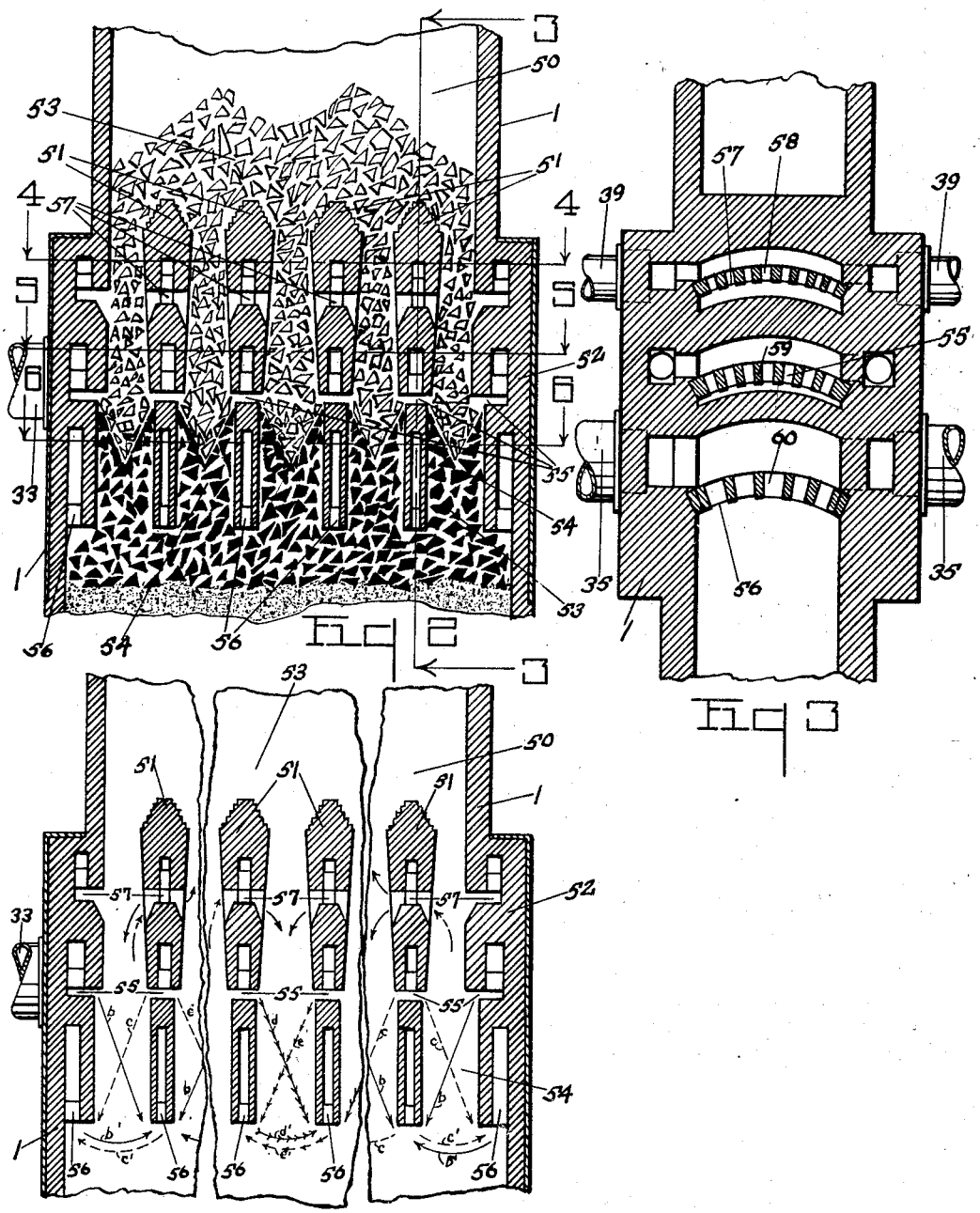

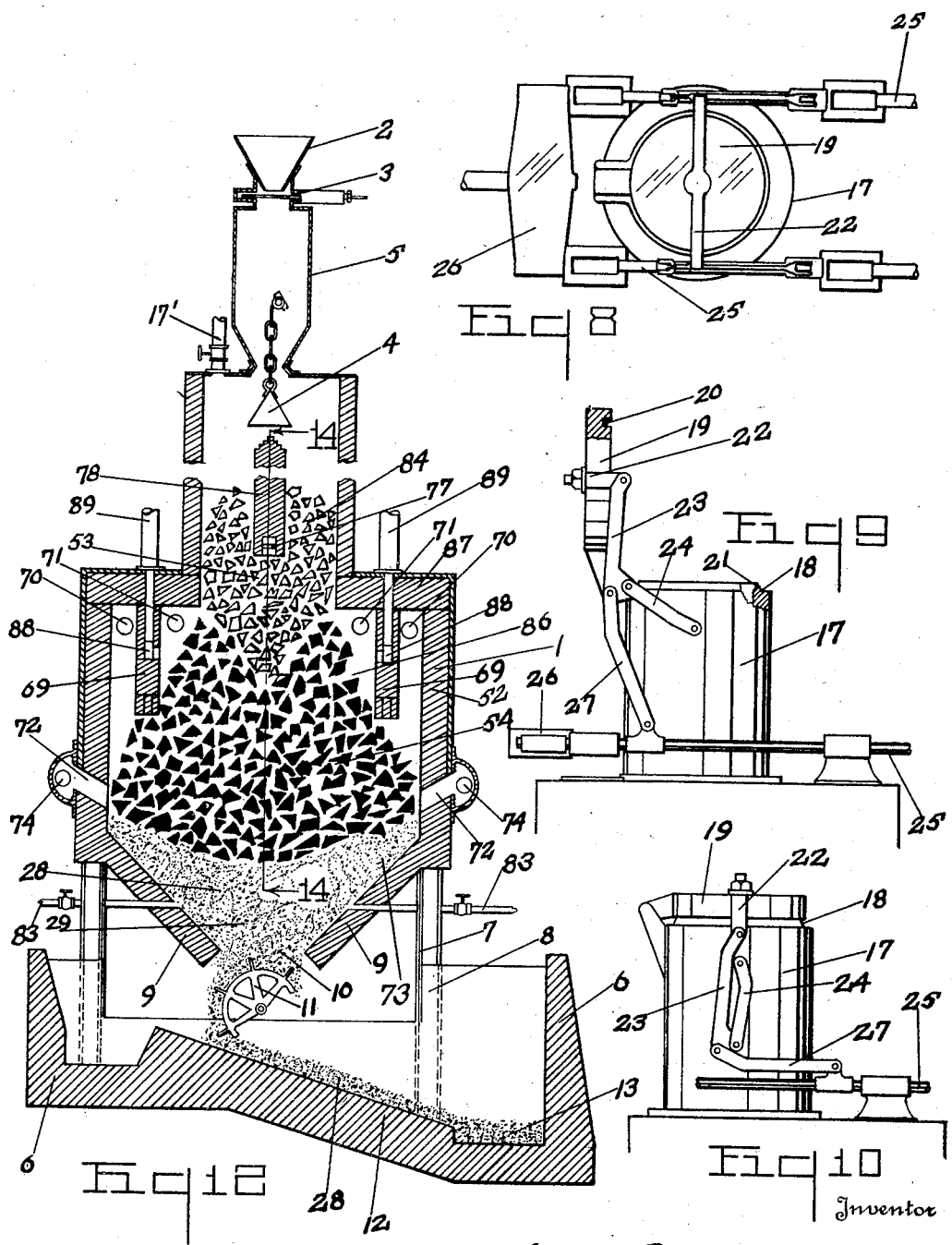

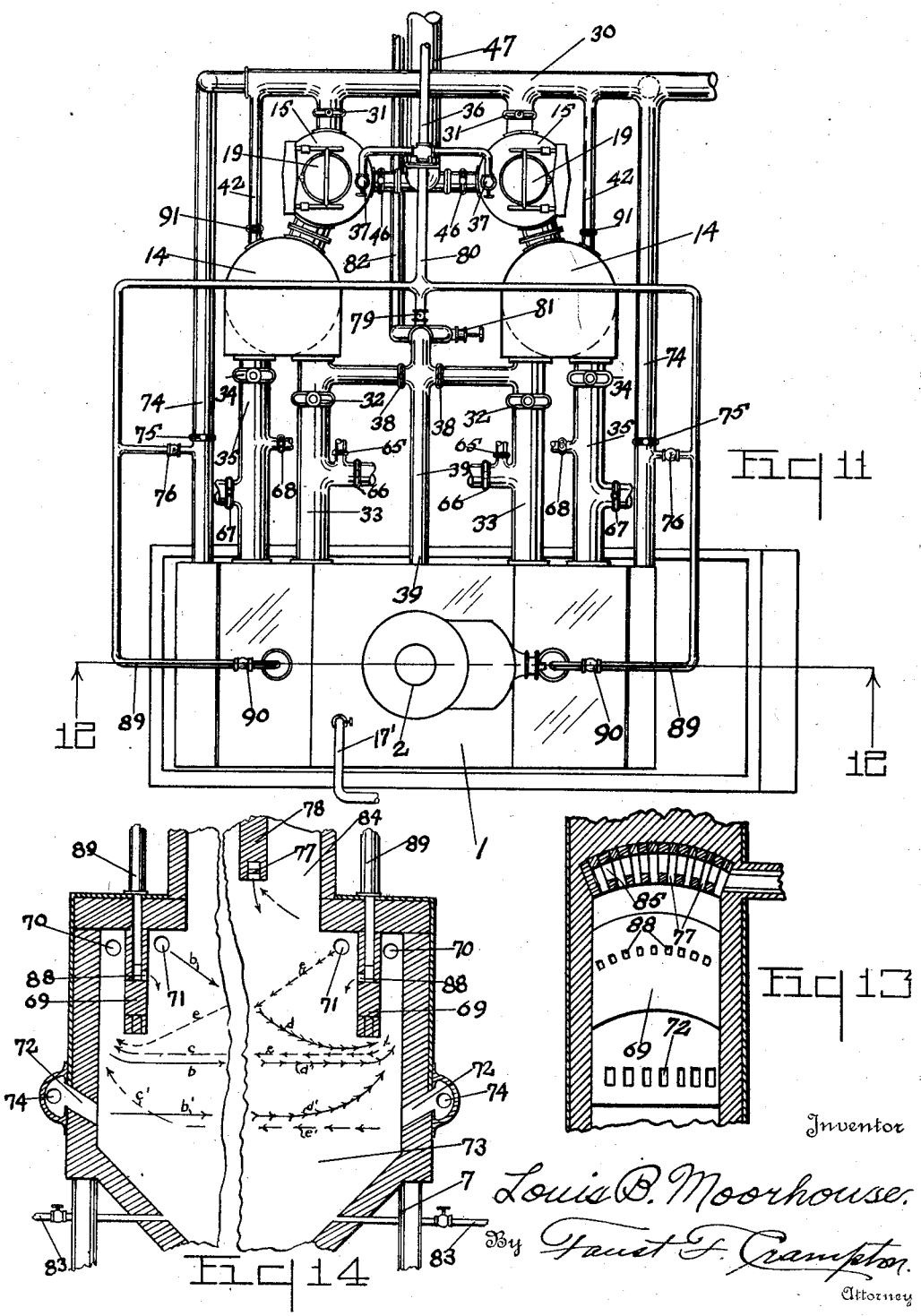

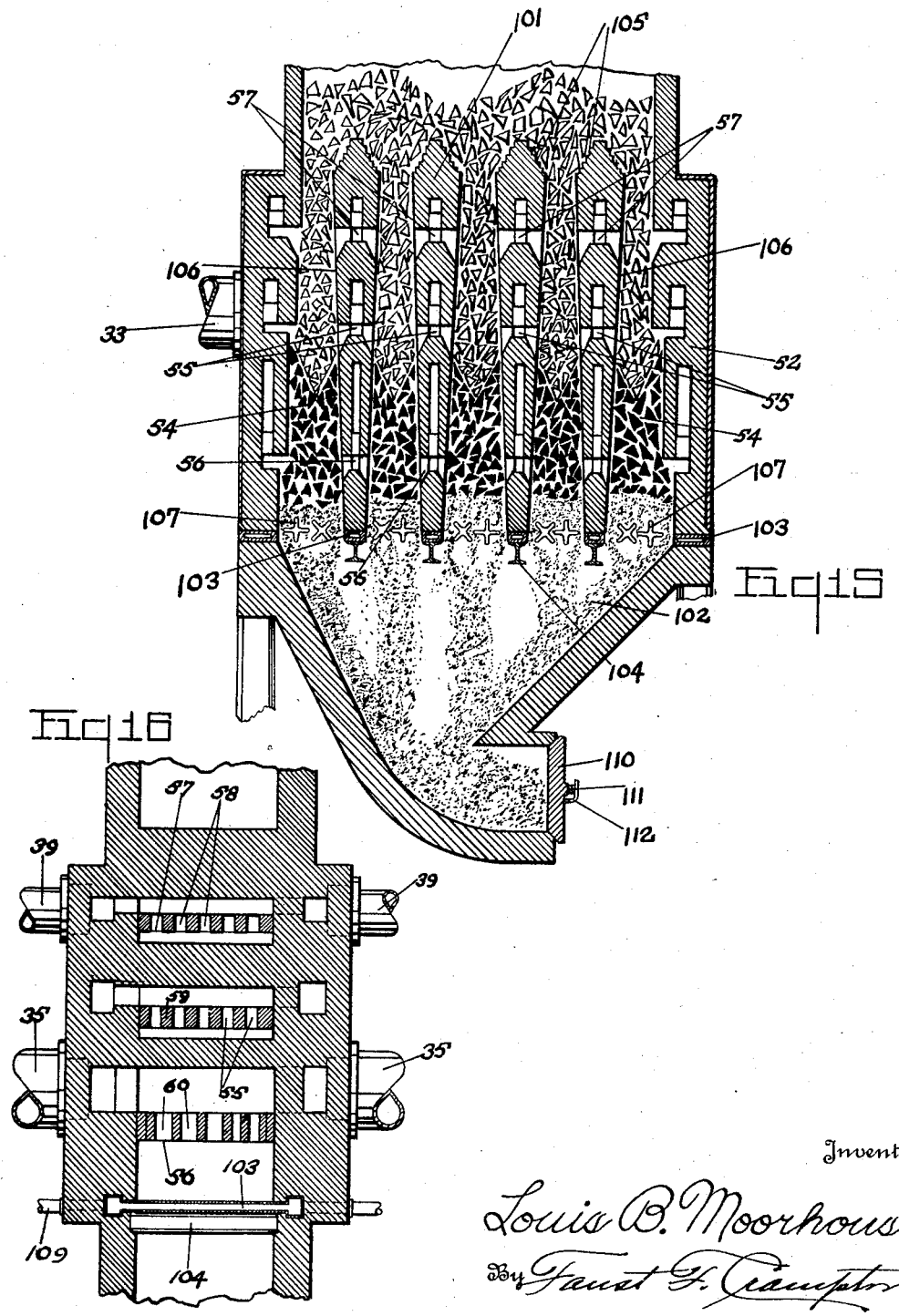

Patented Nov. 10, 1931

1,831,788

UNITED STATES PATENT OFFICE

LOUIS B. MOORHOUSE, OF ENGLEWOOD, NEW JERSEY, ASSIGNOR TO COMBUSTION UTILITIES CORPORATION, OF NEW YORK, N. Y., A CORPORATION OF MAINE

APPARATUS FOR GENERATING WATER GAS

Application filed January 24, 1928. Serial No. 249,127.

My invention has for its object to provide an apparatus wherein producer gas and water gas may be efficiently and economically manufactured from coal or coke or similar material and wherein the objectionable features, usually found or met with in the manufacture of such gases, are greatly reduced. By my invention is provided a means whereby practically all of the gas producing elements of the fuel are utilized or recovered. Thus the apparatus efficiently produces the gases from the fuel substantially as disclosed in the application that resulted in U. S. Patent 1,660,202, and of which this application is a continuation in part.

My invention particularly has for its object to prevent the formation of clinkers and the loss caused by the improper or incomplete utilization of fuel during the operation of the apparatus and also to convert the products of incomplete gasification, such as tar and the like, into available form, which products, in apparatus now known in the art, are largely lost. My invention thus particularly provides a means for controlling or preventing clinker formation and also provides for the proper distillation of the hydrocarbon materials in the fuel body. The gases are discharged from the relatively cold fuel body, while they are in condition of reaction, into the hotter fuel wherein they are decomposed to form larger quantities of the gas. Thus, by my invention, a means is provided for further cracking or breaking up the hydrocarbon materials to form additional gas and the production of a cleaner gas.

My invention not only has for its particular object to control or prevent the clinker formation, but also to prevent the formation of "chimneys" or "blow holes" in the body of the fuel and thus eliminate intense local reaction. By my invention is provided a means whereby there is a uniform descent of fuel to the reaction chamber or chambers and also whereby the region of reaction is maintained in a definite position in the generator. My invention also particularly has for its object to provide a means for obtaining the gases with increased efficiency from finer and cheaper fuel and of obtaining the required time of contact of the gases with the heated fuel and yet wherein the flow of the air or steam or both will still be of substantially the requisite rates through the fuel for the production of the gases and complete consumption of the fuel.

By my invention is also particularly provided a producer gas and water gas apparatus which may be continuously operated by reason of the fact that clinker formation is practically obviated and, in this connection, I have provided means whereby the ash may be discharged without discontinuance of the operation of the apparatus which results in a great saving of the fuel and an increased production of the gas. The invention also has for its object other advantages and features which will appear from the following description and upon examination of the drawings.

The invention may be contained in gas generators and apparatus of different forms and, to illustrate a practical application of the invention, I have selected one or two forms of construction embodying the invention and shall describe them hereinafter. The constructions selected are illustrated in the accompanying drawings.

Fig. 1 of the drawings illustrates a top view of one of the constructions selected as an example of apparatus containing my invention. Fig. 2 is a sectional view taken on the plane of the line 2—2 indicated in Fig. 1. Fig. 3 is a sectional view taken on the plane of the line 3—3 indicated in Fig. 2. Fig. 4 is a sectional view taken on the plane of the line 4—4 indicated in Fig. 2. Fig. 5 is a sectional view taken on the plane of the line 5—5 indicated in Fig. 2. Fig. 6 is a sectional view taken on the plane of the line 6—6 indicated in Fig. 2. Fig. 7 diagrammatically illustrates variations in the different steps that may be carried on by the apparatus shown in Fig. 1. Fig. 8 is a top view of a means for securely and quickly closing the regenerators. Fig. 9 is a side view of the regenerator stack closing valve illustrated in Fig. 8. Fig. 10 is a side view of the stack valve showing the valve closed. Fig. 11 is a top view of a modified form of construction containing the invention. Fig. 12 is a sectional view taken on the plane of the line 12—12 indicated in Fig. 11. Fig. 13 is a sectional view taken on the plane of the line 14—14 indicated in Fig. 12. Fig. 14 diagrammatically illustrates the steps that may be carried on in the apparatus shown in Fig. 11. Fig. 15 is a vertical sectional view through a third modified form of gas generator. Fig. 16 is a fragmentary vertical sectional view taken through the bridge wall and associated parts of Fig. 15.

In the production of the gas, the fuel is consumed in a generator 1. The fuel is fed into the generator 1 through the hoppers 2. The hoppers 2 are provided with suitable gates 3. Drums 5 are located below the hoppers 2 and receive the fuel from the hoppers 2. The lower ends of the drums 5 are closed by the distributing cones 4 which distribute the fuel within the top of the generator 1 when opened and so that it will not collect in a conical pile. The generator 1 is kept closed either by the gates 3 or the cone 4. The drum 5 may be filled when the cone 4 of the drum is in such position as to close the opening in the lower end of the drum 5, but when the cone 4 is in an open position, the gate 3 is closed. By this arrangement the fuel may be fed into the generator 1 without loss of gases and without interruption of the reactions that take place in the generator 1.

The generator of the different forms shown in the drawings are also provided with ash receivers, or troughs, 6, in which water may be inserted for sealing the lower ends, or bottoms, of the generators and thus preventing the escape of gas through the ashes to the atmosphere, and also to prevent air entering. The walls 7 in each case are secured to the supporting columns 8 and extend well into the trough 6 so that notwithstanding the ordinary pressure of the gases within the generator, the generator will be sealed from the atmosphere by the water and escape of gases from the generator prevented, as well as the entrance of the air from the atmosphere through the ash chamber avoided.

The generator may be provided with a grate composed of mechanically movable members for allowing the ash to pass into a confined ash receptacle from which, from time to time, the collected ash may be removed through a tight fitting door, or doors. The receptacle is provided with a steam line for quenching and degasification of the chamber, as in the form shown in Fig. 12. Or the receptacle may be provided with a water seal as shown in Fig. 12.

In the form of construction shown in Fig. 12, the ash receptacle has sloping walls 9 that terminate at their lower ends in proximity to each other and so as to form a narrow passage-way, or opening, 10, between the lower edges of the walls 9. Beneath the opening 10, formed between the lower edges of the walls 9, is located a suitable movable grate, or the equivalent thereof, in each generator, whereby the desired quantities of ash may be from time to time withdrawn from the ash chamber through the opening or passage-way 10. In the constructions shown, a sector rotative grate member 11 is located beneath and in proximity to the lower edges of the wall 9 which will prevent normally the downward movement of the ash but which, upon oscillation, will allow the ash to drop into the trough 6 of the generator.

The trough 6 is, preferably, provided with an inclined bottom portion 12, the lower end of which is located well below the edge of one of the side walls 7 and the corresponding side of the trough 6 is located slightly remote from the side walls 7 to permit the insertion of a hoe or rake or other suitable mechanical means to draw the ashes down the inclined portion 12 as they are discharged by reciprocatory movements of the grate member 11. The trough 6 may also be provided with a receiving chamber 13 that is located at the lower end of the inclined portion 12 whereby the ashes that collect in the receiving portion 13 of the trough 6 may be mechanically removed.

The apparatus is provided with the regenerators 14 and 15 which are constructed in the manner well known in the art, and which are shown conventionally in the drawings. They have the usual checker work, not shown in the drawings, for alternately heating streams of air or steam and being heated by exhaust gases in the manner well known. The generator 1, in the form of construction illustrated in Fig. 1, is provided with headers 16 wherein the gases may be received from the generator 1 to permit settling of the sediment such as fine ash or dust. They prevent the deposition of ash in the regenerators 14 and thus prevent fusion of the brick forming the checker work contained therein. The hot gases pass through the regenerators 14 and 15 and if the apparatus is provided with the headers 16 they also pass through the headers 16.

In certain methods of operation and where certain fuels are used there may result a quality of fine gas so high in combustible matter that the use of additional means of waste heat recovery, over and above that provided by the regenerators 14 and 15, may be desirable. Such additional heat recovering apparatus may be furnished by the supplement of waste heat boilers. For the sake of simplicity such conventional apparatus is not described nor indicated in the drawings. Their preferred location in the apparatus shown would be intermediate the exit of regenerators 15 and the stack valve 19.

During alternate periods in the operation of the apparatus, air under pressure is admitted to one of the regenerators 15 and through a corresponding regenerator 14 to the generator 1. The products of combustion pass out through the set of regenerators 14 and 15 located on the other side of the generator 1 which may be opened to the atmosphere through the regenerators 15, of the second mentioned set, if the water gas is being formed. When, however, producer gas is being formed, the regenerators 15 are maintained closed to the atmosphere at all times. Inasmuch as the movement of the air is through the regenerators 14 and 15 on one side during one period of the operation and then through the regenerators 14 and 15 on the other side during a subsequent period of operation, and inasmuch as the hot gases, under considerable pressure, pass through the regenerators 14 and 15 into the gas collecting main during intermediate periods, I have provided a means whereby the regenerators 15 may be quickly closed to the atmosphere and yet also whereby the closing means may be securely locked in the closed position.

As shown in Figs. 8, 9, and 10, the means for closing each of the regenerators 15 consists of the shell 17 having a valve seat 18 located at its upper end. The stack valve member 19 is provided with a recess having a heat resisting packing 20, such as asbestos, located in an annular channel formed on the under side of the valve member 19, and so as to cover a ridge 21 formed on the upper end of the shell 17. The valve member 19 is provided with a yoke 22 that extends over the top of the valve member 19 and to the ends of which are pivoted links 23. Links 24 are pivoted to the sides of the shell 17 and at points such that when the valve member 19 is closed, the pivot points of the links 23 to the yoke 22 will be substantially in the same vertical line in which the pivot points of the links 24 to the sides of the shell 17 are located. The links 23 and 24 are also pivotally connected together and at points which are substantially in the same vertical lines that pass through the other pivot points of the links and which, when the valve member 19 is closed, will be located below the other said pivot point.

Means are provided for drawing the link 23 downward and so as to swing the links 23 toward the links 24. By this arrangement there will be a toggle action as between the links 23 and 24 and their points of connection with the valve member 19 and the shell 17 respectively. Thus the valve member 19 may be quickly drawn to its seat 18, and, during a portion of the movement of the lower ends of the links 23, the valve member 19 will be tightly sealed on its seat 18. To operate the links 23, I have provided reciprocatory bars 25 that may be yoked together by means of the yoke 26 and thus operated in unison. The links 23 are connected to the bars 25 by means of the links 27 of a length sufficient to cause the links 24 to rotate on their pivotal connections to the shell 17 which operates to raise the lower ends of the links 23 and 24 and, consequently, to raise the valve 19. The link 27 is of a length sufficient to raise the ends of the links 23 and 24 to near the upper end of the shell 17 which throws the valve member 19 to a wide open position. Upon the return movement of the yoke 26, the links 23 and 24 are drawn down, which swings the valve 19 down to its seat 18 and, at the same time, brings the center line of the pivotal points of connection between the links 23 and 24, substantially at right angles to the direction of movement of the bars 25 which brings the valve member 19 down on its seat under a pressure obtained by the full force to which the bars 25 are subjected as well as by the toggle relation between the links 23 and 24 and the shell 17 and the valve member 19.

Under certain conditions or operations, such as in forming water gas, the regenerators 15 are alternately connected by means of valves 31 with a main 30 through which air under pressure is supplied to one or the other of the regenerators 15. The air passes through the checkerwork, not shown, in the regenerator 15 and through the checkerwork, not shown in the regenerator 14 connected with the said regenerator 15. It then passes from the regenerators 14, through valves 32 and pipes 33 into the generator 1, as hereinafter described.

Under certain conditions of operations, or to accomplish the performance of certain reactions, steam may also be admitted through the valve 34 located in the pipe 35 and thus conducted to the generator. The steam enters through the steam supply line 36 and is admitted to the regenerators 15 through valves 37 and is superheated as it passes through the checkerwork located in the regenerators 14 and 15. During the alternate periods, the steam passes through the valves 32 and 34 and enters the generator 1. Also, if desired, a valve 38 may be opened which will permit the steam to enter the generator 1 through a pipe 39. If desired, additional steam may be conducted through pipes 40 and the pipe 39 to the generator 1. Also pipes 42 may be connected with the main air supply pipe line 30 and to the regenerators 14 which may be directly connected to the generator 1, as in the form shown in Fig. 11, or they may be connected to the generator 1 through the headers 16, as shown in Fig. 1, where the combustible portion of the products may be further consumed by the additional air admitted through the pipes 42. The ports and generator connections with the parts of the system exterior to the generator 1, are particularly described hereinafter, together with the functions that they perform in connection with the generator 1.

If desired, the pipes 39 may be connected through valves 44, as shown in Fig. 1, with a pipe line 45 which is maintained at a pressure below the pressure of the interior of the generator 1 by means of an exhauster. By opening one or the other of the valves 44, certain hydrocarbons distilled by the heat of the burning fuel may be drawn up through the body of the fuel and precipitated by becoming chilled, while at the same time certain of the more volatile matters of the coal will pass off with the gaseous hydrocarbons through one or both of the pipes 39 and 45. If it is deemed undesirable to recover volatile hydrocarbons in this manner, they are directed downwardly and "cracked" in the hotter regions of the generator and go out through the pipes 35 through the valves 34, the headers 16, and the regenerators 14 and 15, and through valves 46, and a pipe line 47, to suitable storage reservoirs or consuming devices, not shown. When it is desired to enrich gases coming from the generator by the cracking of oil, then oil may be admitted at the top of regenerator 14 through any suitable oil atomizer and through the control valves 14'. If desirable, the gases issuing from the generator 1 through valve 34 may be taken directly out of the header 16 through valve 16' and thus the gas may be led direct to the proper cooling and condensing equipment without passing through regenerators 14 and 15 shown in Fig. 1.

The construction is such that in the production of either producer gas or water gas, lignite or bituminous, preferably, non-coking, coal may be used.

If lignite is used as fuel, its high moisture content readily breaks it up under heat into small particles and thus it offers high resistance to gas flow. It may, however, be economically gasified in the type of apparatus illustrated in Figs. 1, 2, 3, 4, 5, 6, and 7. Since the direction of flow of the reacting gases is downward through the incandescent fuel, the moisture of the lignite is dissociated through the usual water gas reaction and not merely vaporized. The coal enters a fuel receiving chamber 50 from the drums 5 and collects above bridges or partition walls 51 which are closely positioned in order to reduce the length of the gas or air or steam currents that are directed transversely and downward through the fuel. By this construction a finer fuel, and consequently a cheaper fuel, may be used. Also, a coal that breaks up into finer parts, may be used. Also, by reason of the location of the bridges 51, localization of drafts, or the formation of "chimneys" or "blow holes" through the coal is prevented since the ports of the generator 1, which are located in the bridges 51 and the side walls 52 of the generator 1 are closely positioned, and the side walls 52 and the bridges 51 operate to constantly disturb the relation of the particles of the fuel by reason of the relatively continuous downward movement and the closely positioned bridges 51. Moreover, the bridges 51 have opposing surfaces that slope downwardly away from each other, which also operate to cause the fuel 53, as it approaches the main reaction chamber 54, to loosen up and permit relatively free passage of the gases, air and steam, which thus permit ready mingling of the gases, air and steam, with the partially consumed fuel and with the unconsumed fuel.

In heating a bed of fuel, in the production of water gas, the carbon of the fuel is first oxidized to a preponderance of carbon dioxide. The carbon dioxide, when passing through the hot incandescent fuel, is reduced by the addition of carbon whereby carbon monoxide is formed. The formation of carbon monoxide from carbon dioxide depends upon the temperature and the time of contact. The air blast operates to elevate the temperature of the fuel and to store heat within the fuel, which heat may be subsequently utilized at such elevated temperature for the formation of water gas through the combination of carbon with the oxygen produced by the dissociation of steam, thus generating carbon monoxide and hydrogen. During the blast or heating period, the maximum economy of fuel is effected when the carbon is burned to carbon dioxide, that is to say, when within the fuel the maximum generation of heat per unit of carbon is effected. Inasmuch, therefore, as an increased temperature within the fuel bed is the object of the air blasting period, and because of the fact that a long time of contact between products and fuel operates to produce carbon monoxide, which does not produce within the body of the fuel the maximum amount of heat, it is necessary either to decrease the distance of travel, or to run the air at a rapid rate through the fuel in order to decrease such time of contact. The latter procedure results in carrying dust and finer particles out of the generator. By placing the ports close together, particularly, when a fine fuel is used, the air may be forced through the fuel at such a rate that the lighter particles will not be carried away and yet the maximum amount of carbon dioxide will be formed. This will produce the maximum amount of heat per unit of fuel within the fuel bed preparatory to the passage of the steam through the fuel bed.

The air is directed from the main line 30 into the regenerators 14 and 15 which have been previously heated by the discharge products of a previous air blast period and which operate to heat the air. The air passes through the pipes 33 into passage-ways that lead to the ports 55 formed in the side walls 52 and the bridges 51 of the generator 1 shown in Fig. 2. The air passes diagonally downward from the ports 55 through the fuel bed 53 in the reaction chamber 54 to the lower part of the generator side wall 52 and to the edges of the bridges 51 and to the openings, or outlet ports, 56, formed therein. The air thus passes down across the hot fuel located between the bridges 51 and between the bridges 51 and the side walls 52 of the generator, and the heat and temperature of the fuel is greatly increased. The products that are formed during the movement of the air through the finer fuel pass out through one of the pipes 35 and the valves 34 into the header 16 and thence through the other set of regenerators 14 and 15 and out through the stack valve 19. During the succeeding period the steam flow may be directed through the same path or it may be directed diagonally down and across from the alternate bridges 51 or generator wall 52.

As shown in Fig. 5, inlet ports 55 of alternate bridges 51 and walls 52, of the generator 1, are connected with one pipe 33 and the other inlet ports 55 are connected with the other pipe 33 and, the outlet ports 56 of alternate bridges 51 and walls 52 of the generator 1 are connected with one pipe 35 and the other outlet ports 56 are connected with the other pipe 35, as shown in Fig. 6. In the construction shown in Figs. 1, 2, 3, 4, 5, 6, and 7, the inlet port 55 and the outlet port 56 in any single wall 52 or bridge 51 of the generator 1, make connection with one of the pipes 33 and one of the pipes 35, which first named pipes 33 are connected to the same side of the generator 1, as shown in Figs. 1, 2, 3, and 7. Thereby, the flow of air or steam, or mixture of air and steam, through ports 55 will be from one set of bridges 51 or walls 52 of the generator 1, to the lower edges of the adjoining bridges 51 or walls 52, where the said ports 56 are located, during one period, and will be from the ports 55 of the other set of bridges 51 or walls 52, of the generator 1, to the lower edges of the adjoining bridges 51 or walls 52 during another period so that in succeeding or subsequent blasts the paths of the air movement will cross the path of flow during the preceding periods.

The walls or bridges 51 serve to furnish a large area of incandescent surface along which the charge of fuel descends and by virtue of their heat content and radiant surfaces accelerate the rate of reaction. These walls may begin at their upper limit within the fresh fuel magazine 50 and may terminate above the ash line as indicated in Fig. 2 or they may otherwise start at the upper limits of the top of the generator and extend downwardly to the grate or even through the grate to the bottom of the ash pit. Such continuous walls would make each fuel division a separate generator unit; that is, separate as to fuel feed and as to ash withdrawal and yet such segmentation would not interfere in the least with the scheme of flow of air and steam into the fuel nor with the flow of the products out of the fuel and the same system of regenerators, connections, valves, and ports will produce the same results as are herewith described.

During different periods the directions of flow may be across any one section or unit of the generator 1 in opposite general lateral directions though diagonally downward and through the reaction chamber 54 or incandescent fuel. The connections are such that the flow during one period is from the bridges 51 and one side wall 52 toward the adjoining bridges 51 or side wall 52 diagonally downward to the lower ports 56, and during different periods, the flow is from the last named bridges 51 and side wall 52, thus giving a reversal of the general lateral direction in each generator unit, that is, in each space formed between adjacent bridges 51 or bridge 51 and generator wall 52.

This produces a condition of fuel bed in which that portion of the fuel below the point of crossing of the upper limits of succeeding blasts is substantially entirely incandescent, such condition being illustrated in the sectional drawing, Fig. 2. By this crossing of the paths of blasts, therefore, the volatilized hydrocarbons issuing into the first portion of the paths of the air blasts, are carried downward through fuel left in a state of incandescence by the preceding blast and there broken up and burned before reaching the exit ports 56. The steam may now be directed through the same ports 55 that the air was directed in the preceding operation which will cause the most intimate contact between the steam and the most highly heated portion of the incandescent fuel thereby causing the maximum formation of water gas from the steam and carbon of the fuel, which gas passes out through the same ports 56, as before.

However, it has also been found advisable to admit the steam through the same regenerator through which the products of the preceding air blast were directed and by the intense heat that was produced in the checker work during the preceding operation, that is, during the air blast, to more highly superheat the steam which will then be directed through the ports 55 of bridges 51 and walls 52 other than those through which the air blast was directed in the preceding operation. The steam thus more highly superheated will cause a greater distillation of hydrocarbons from the coal contiguous to the ports 55 and thereby the products of dissociation of hydrocarbons will bear a higher ratio to those gases formed by dissociation of steam, that is to say, by this procedure there will result an increase in the ratio of hydrocarbons utilized for forming combustible gases to the hydrocarbons utilized for heating the fuel during the blast and ultimately a gas richer in hydrogen and methane or other fixed hydrocarbons will be produced thereby. In the succeeding operation, the air may follow, that is, may pass through or along the incandescent fuel in the same general direction of the path through which the steam passed in the preceding operation and will be directed through the ports 55 through which the steam was directed in the said preceding operation. The products thereof will be passed through the ports 56 and out through the other regenerators 14 and 15 and through the valve 19. The valve 19 will then be closed and the steam will then be passed back through the last named regenerators 14 and 15 into the generator 1 through the ports 55 other than those through which the air passed in the preceding operation. Also, in succeeding steaming periods (gas making periods) the paths of the steam and gases may be caused to cross. This crossing of paths of the currents of steam with the paths of preceding air currents causes the hydrocarbons volatilized in the upper portion of the passage to be dissociated and gasified.

The movement of the steam, of the air and gases from the ports 55 and out through the ports 56, causes the movement of vapors through the hot fuel into and through the hotter fuel at lower points in the reaction chamber 54 of the generator 1 with the result that the hydrocarbons are largely decomposed into their elements and thus an increased production of gas effected and, at the same time, the gas freed from tar and carbon particles. The carbon will remain in the fuel to be further consumed in subsequent periods of operation of the generator 1.

By this arrangement the air is directed downward into the fuel which produces a maximum heat within the upper portions of the reaction chamber or parts thereof. Inasmuch as the formation of the carbon monoxide from the carbon dioxide is endothermic, such formation, if it occurs, will occur near the ash line which will operate to avoid excess temperature and, consequently, reduce or eliminate the formation of clinkers near the ash line.

By directing steam through the pipe 40 or superheated steam through valve 38, thence into the generator 1 through pipes 39 by way of ports 57 during the time that the steam is directed into certain of the ports 55, the tarry vapors arising from the distillation of the fuel are directed into the incandescent fuel below, where they will be broken up or cracked to form lighter hydrocarbons and pass out through one set or the other set of ports 56. In this manner, especially if superheated steam is used, a greater quantity of the volatile components are distilled and gasified during the gas making period.

If desirable to separately recover the volatile constituents of the fuel, the ports 57 are located in the bridges 51 and in the side walls 52 of the generator 1. The ports 57 are located well above the line between the incandescent fuel and the uncarbonized fuel and so as to be above the fuel carbonized by the heated fixed gases and vaporous hydrocarbons that rise from the reaction chamber 54 of the generator 1. The ports 57 are connected with the pipe 39 and through the valves 44, with the reduced pressure main 45. This will operate to draw the volatile constituents of the fuel, which are volatilized in the vicinity of the reaction chamber 54, that is, in or in the vicinity of the incandescent fuel, upwards. It will thus draw off a considerable percentage of the lighter hydrocarbon gases and vapors, although it will leave in the uncarbonized fuel, located intermediate the incandescent fuel and the ports 57, the heavier and higher boiling point hydrocarbons which will be condensed by the chilling action of the cooler fuel in the vicinity of and below the ports 57. This will operate to subject certain portions of the heavier hydrocarbons to repeated vaporization and cracking action near the lower regions and a subsequent condensation in the higher and cooler regions. The decomposition products so formed will pass off through the ports 57, or pass off through the ports 56, during the same or subsequent period of operation of the generator 1. The tarry products and ammonia contained in the hot mixture so withdrawn through the ports 57 may, if desired, be subsequently separated and collected by the customary means for condensation and separation. By this arrangement the tarry products, which would ordinarily pass into the checkerwork of the regenerators, will be prevented from causing an excess of heat in the checkerwork and will be recovered as valuable by-products.

The bridges or partitions 51 and the walls 52 of the generator 1 may be constructed in different ways, but I have found it desirable to so construct the walls 52 and the bridges 51 of the generator 1, that the coal in its descent will leave passage-ways in the vicinity of the ports. In order to accomplish this I have so formed the ports that the upper surfaces of the ports 55 and 57 will overhang the openings so as to prevent the collection of the fuel within the ports and thus prevent the clogging of the ports. In other words, the general direction of the openings that form the ports is downwards so that the downward moving fuel will be carried from the ports and leave a lateral or horizontal passage-way over the surface of the fuel. To obtain more uniform flow of gas, I have provided perforated arches 58, 59, and 60. The ports, moreover, may be in the form of slots, such as that shown, or each port may be formed of a plurality of openings formed by partitioning the slots. Also, the lower surfaces of the ported wall may be made sloping as in the case of the ports 57. The ports 56 open from the lower edges of the bridges and the overhanging portions of the walls of the generator which leave laterally extending passageways beneath the ports to permit a free outlet of the gases.

The generator shown in Fig. 1, may be used in the production of producer gas as well as in the production of water gas, since in the production of producer gas the air and the steam may be directed through the ports 55 at the same time and, consequently, the stack valves 19 will be maintained closed at all times. In the operation of the generator 1, there will be the same crossing of the paths of movement of the air and steam from and to the ports 55 and 56, in consecutive periods of operation of the generator 1. The producer gas will be collected in the pipe 47 in the same manner that the water gas was collected in the pipe 47. Also, if it is desired to collect the volatile materials of the coal and the tarry products, they may be drawn out through the ports 57 which are connected with the exhaust pipe 45 in the same manner as in the water gas production.

Also, if it is desired, air or steam may be directed through the ports 56 other than those through which the gases are drawn, that is to say, the alternate ports 56 will afford inlets for the steam and air while the other ports 56 will afford outlets for the gases that are produced by bringing the steam in contact with the incandescent fuel and thus produce a lateral sweep of the air and gas or vapor.

The steam from the ports 56 reduces the clinker formation and causes all of the fuel to be consumed. In generators where air is admitted through ash or clinker and directed upward through an incandescent fuel bed, it prevents the proper settling of the finer ash particles and they are carried upward from the ash zone into the hottest portion of the fuel bed. Thus, unless large quantities of steam or some other temperature deterrent is used, there exist those conditions conducive to fusion of the ash, which upon subsequent cooling, forms clinker. Solidification of fused ash in the presence of unburned fuel always encases certain quantities of the fuel and prevents the utilization of such encased fuel which greatly decreases the efficiency of the generator. In an effort to control clinker formation, the operator will ordinarily use too much steam to prevent the formation of the fused ash and it is practically impossible for an operator to secure the proper balance between air and steam. In the form of construction illustrated and in generators containing my invention, the sweep or flow of gases being generally in a lateral direction near the ash line, obviously none of the ash is carried up into the incandescent fuel and there is nothing to prevent the ash from sifting downward onto the ash bed. The flow of gases being downward, as well as lateral, operate to carry down all ash towards the ash zone, and consequently clinker formation is greatly eliminated. In order that there may be no collection of combustible gases in the space above the fuel in the top of the fuel magazine, a suitable source of inert flue gases is conducted to the interior of the top of the generator through the pipe 17' under such pressure as to prevent the accumulation of combustible gases that might otherwise arise from the lower reaction zone.

The form of generator illustrated in Fig. 11 is a simplified or single unit apparatus operated in like manner as the multiple type shown in Figs. 1, 2, 3, 4, 5, 6, and 7, and is designed to be used either for water gas or producer gas. In this apparatus, when producer gas is to be formed and used hot, the regenerators may be entirely cut off by closing the valves 34 and 32 and opening the valves 65 and 66, which are respectively steam valves and air valves, located on one side of the generator 1 and one valve 67, which is a gas outlet valve, located on the other side of the generator 1, during the blast or flow of the mixture of steam and air in one direction through the generator 1 and opening the other steam, air and exhaust valves when the flow is in the opposite direction. Steam may also be admitted into the pipes 35 through valves 68. When, however, the producer gas is to be used cold, the valves 65, 66, and 67, are closed, and the valves 32, 34, and 31, and the steam valves 37, also gas outlet valve 46, are manipulated in order to direct the air and steam into the regenerators to heat the air and superheat the steam from whence they are directed into the generator 1 through the proper ports. When the air and steam is directed into the pipe 33 and either through the valves 65 and 68 on the one hand, as when the producer gas is to be used hot, or when it is directed into the pipe 33 through the regenerators 14 and 15 and the valves 32, 31 and 37 as when the producer gas is to be used cold it enters the generator 1 from the pipe 33 into the ports 71 and over the upper portion of the incandescent fuel on one side or the other side of the generator according to which of the pipes 33 receive the air and steam. The mixture flows diagonally downward across the generator 1 below the apron walls 69 to the outlets 70 which causes the blast to pass to the bottom of the incandescent fuel chamber of the generator 1 and directs the gases formed into the pipe 35 on the other side of the generator 1 whence it may be directed either through the regenerator on the said other side, if the producer gas is to be used cold, or it may be directed through the valve 67 connected to the said pipe 35 when the producer gas is to be used immediately. If desired, air and steam may be also directed through the pipe 35 and the ports 70 located on and connected with the same side of the generator 1 that the port 71 is located on and through which the air and steam is being directed, the gases from the fuel and which are formed by the air and steam coming from the ports 71 and 70 on one side being collected and directed out through the port 70 on the other side of the generator. This produces a flow of air and steam and of gases of large cross-sectional area through the incandescent fuel, whereby a large quantity of the gas may be formed and whereby a voluminous incandescent fuel bed may be maintained.

In the generator shown in Figs. 11, 12, 13, and 14, I have also provided passage-ways 72 located near the ash zone 73, and which extend diagonally downward to direct air and steam, or steam alone, along the upper side of the ashes or substantially along the division line between the incandescent fuel and the ashes. The ends of the passage-ways form ports for the steam and air which maintain the incandescent fuel of this lower region at the proper temperature to produce a complete combustion of the fuel and yet to prevent the fusion of the ash and the formation of the clinker.

The passage-ways 72 communicate with pipes 74 which are connected with the air pipe 30 through a valve 75 and with the steam line through a valve 76 on each side of the generator. The valves 76 and 75 are opened when the air and steam passes through the port 71 on the same side of the generator 1 and, if desired, also through the port 70 on the same side of the generator 1, the gases being collected through the port 70 on the other side of the generator 1. The proportion of the air and steam that is directed through the ports 71 and 70 and the passage-way 72, may be varied as desired. I find it preferable, however, to direct more air through the port 71 proportionate to the steam than through the passage-way 72 and, in fact, if desired, very little air may be directed through the passage-way 72.

In the construction shown in Figs. 11, 12, 13, and 14, I have provided a port 77 located in a bridging wall 78 that corresponds to the ports 57 in the form of generator illustrated in Figs. 1, 2, 3, 4, 5, 6, and 7, and so that when water gas is produced by the use of the construction illustrated in Figs. 11, 12, 13, and 14, steam may be directed through the pipe 39 which connects, through a valve 79, with the steam line 80; or superheated steam may be directed through the pipe 39 which connects through the valves 38 with regenerators 14 and 15, or the port 77 may be connected through the pipe 39 and a valve 81 with gas exhaust pipe 82 when in the generator 1 it is desired to remove tarry products or hydrocarbon gases from the uncarbonized and partially carbonized fuel, such connection being used either when the generator is being used for the production of water gas or of producer gas.

If it is desired, steam or water may be directed through pipes 83 into the ash zone 73 to quench the ashes before they reach the shaker member 11. By this arrangement the steam or water used for quenching the ashes may be controlled which prevents spasmodic introduction of steam into the generator 1 by reason of the periodical fall of ashes into the water seal of the trough 6. The ashes may thus be continuously quenched which results in a continuous introduction of a definite amount of steam into the generator 1. The steam so introduced creates an inert atmosphere within the ash receiver.

The generator illustrated in Figs. 11, 12, 13, and 14 is provided with a fuel magazine 84 in which is located the bridge wall 78 which prevents the fuel 53 from becoming packed locally and causes the fuel 53 to be fed loosely into the incandescent, or main reaction chamber 54. The port 77, located in the bridging wall 78, opens downward through a perforated arch 85 (shown in Fig. 13) which prevents the accumulation of portions of the fuel in the openings and thus prevents clogging of the openings.

The fuel 53 is discharged from the fuel magazine 84 into a larger chamber 86 which is formed between the two apron walls 69 that extend down into the incandescent, or main reaction, chamber 54 of the generator 1. The top of the incandescent, or main reaction, chamber 54, overhangs the interior of the chamber and thus leaves passage-ways, or areas, that permit the entering air and steam to move laterally over the incandescent fuel in the main reaction chamber 54 and, consequently, greatly extends the area through which the air or steam or both may be introduced into the incandescent fuel. The ports 71 are located in the corner formed by the top wall 87 of the walls 69 and the side wall 52 of the generator 1. This prevents clogging of the ports 71 by the fuel.

The depending apron walls 69 also afford a similar lateral passage-way for movement of the gases to and from the incandescent fuel at a lower region in the incandescent, or main reaction, chamber 54. They bring the lower portions of the paths of the gases down to a low point in the incandescent zone. If, however, it is desired, the same construction can be made with reference to the ports 70, that is to say, portions of the top of the generator may be made in stepped relation and the incandescent chamber enlarged step by step. The ports 70 will then be located in proximity to the incandescent fuel as is the case in the port 71.

In order to prevent the formation of clinkers at the sides or near the lower inner edges of the walls 69, the walls 69 may be provided with ports 88 through which steam may be introduced through the pipes 89 and the valves 90.

When the generator shown in Figs. 11, 12, and 13, is to be used for the production of water gas, suitable air valves are opened on one side of the apparatus as, for example, on the right side of the apparatus during the periods of air flow. Thus air may be admitted through the valves 31 to the regenerators 15 and 14 on the right side. It passes through the regenerators 14 and 15 and through the pipe 33 and valve 32 and, if desired, also through the pipe 35 and valve 34, thence through port 71 and if through pipe 35, also through port 70 into the generator 1. It then passes downward and laterally through the fuel bed to the opposite side of the generator 1, the products passing out through the opposite port 70 and through the other set of regenerators 14 and 15 and through the regenerator stack valve 19 on the left side. During this period an air valve 91 on the air line 42 on the left side leading to regenerator 14 may be opened to admit secondary air for the combustion of such unoxidized constituents as may exist in the gases and vapors leaving the generator.

During a subsequent steam flow period the stack valve 19 and the air valves 31 and 91 are closed and the steam valve 37 on the right side is opened. The steam is superheated in regenerators 15 and 14 and then passes through the port 71 or ports 71 and 70 through the generator 1, moving in the same direction as the air of the last described period and passing by way of the opposite port 70 and pipe 35 to and through the opposite regenerators 14 and 15. It thence passes by way of valve 46 on the left side of the apparatus to the gas main 47.

During a subsequent period of air flow valves 46 and 37 and also inlet valve 34, are closed and the air valve 31 on the left side of the apparatus is now opened and air admitted to regenerator 15 on the left side. The air then passes through pipe 33 and valve 32 and, if desired, also through pipe 35 and valve 34, thence to the generator by way of port 71, or ports 71 and 70. It then passes through the generator 1, the diagonally downward flow crossing the part of the air flow of the preceding period of air flow and the lateral component of flow being reverse to that of the preceding period of air flow. The products thus pass out of ports 70 and pipe 35 and valve 34 to regenerators 14 and 15, all positioned on one side of the regenerator opposite to that to which the products of the first period were directed, such products passing finally through the other stack valve 19, on the right side. During this period air valve 91 on the right side in the air line 42 leading to regenerator 14 may be opened to admit secondary air for the combustion of unoxidized gases and vapors leaving the generator.

The last mentioned stack valve 19 and the air blast valves 31 and 91 are closed and steam is admitted by way of valve 37 on the left side. The flow of steam through the steam flow period is through the regenerators 15 and 14 and the flow of steam and gas through the generator 1, as well as the flow of gas through the other regenerators 14 and 15 being all substantially through the same paths as the air and products of the preceding period of air flow. The gas finally passing into gas main 47 by way of valve 46 on the right side of the apparatus.

Valve 76 for steam admission or valve 75 for air admission, may be opened to admit steam or air through pipe 74 and port 72 when the port 71, on the corresponding side of the generator 1, is opened, the resultant reaction products passing out with the other reaction products arising from the flow from the ports 71 and 70 to the opposite side of the generator through the opposite port 70.

The sequence of the periods above described may be changed to suit quality of the fuel or condition of the heat or according to the gas required.

The air and steam flows may be greatly varied in order that the maximum efficiency of gas production may be accomplished by either of the generators. In addition to the air flow, the steam flow, or the mixture of air and steam flow indicated in Figs. 7 and 14, the volatile gases may be exhausted by connecting an exhausting means with the passageways that lead to the ports 57 of the generator 1 shown in Figs. 1 and 2, or to the ports 77 shown in Fig. 12. Or superheated steam may be directed from certain ports, such as ports 57 and 77 through the colder fuel to carry down hydrocarbon materials for further cracking. These latter operations may be performed in conjunction with any of the operations indicated in Figs. 7 and 14. When it is desired that the maximum of condensible hydrocarbons be obtained from the fuel the vertical component of flow may be reversed by opening, on the gas producing period, valve 34, (Fig. 11), giving admission to port 70 on one side of the generator and opening valve 66 allowing the exit gases to flow out of ports 71 on the other side of the generator. The gases passing valve 66 may be led to suitable cooling and condensing equipment. On the reversal of horizontal component of flow the companionate valves of the pipes to the opposite walls will be operated in like manner.

As shown in Fig. 2, air is admitted through one set of ports 55 and moves diagonally downward toward a set of ports 56, the said set of ports 56 being located in walls 52 or bridges 51 that are located next in order to the walls 52 or bridges 51 in which the said ports 55 are located, the currents moving preferably laterally. Steam is then admitted through the said ports 55 and the gases are expelled from the said ports 56, the general movement being also laterally. In the subsequent period the streams of air flow from the ports 55 to the ports 56 in a general lateral opposite direction. Preferably, the steam follows the air paths of the preceding period, so that the order would be, the formation of air streams in a general lateral, or diagonally downward direction towards one side of the generator or division of a generator, as in Fig. 1, while these streams are followed by steam streams in the same general direction, and then followed by air streams in a general lateral or diagonally downward direction towards the other side of the generator division or unit. The air streams are followed again by steam streams that follow the same paths. Also, air may be allowed to pass out of ports 56 to ports 56 of the neighboring walls 52 or bridges 51 toward which air may be flowing from the ports 55 located directly above the first named ports 56. Streams of air will then be caused to move in a substantially horizontal direction across the generator 1, as well as diagonally downward. Steam streams may also be directed along the substantially horizontal paths of the air streams of the preceding period. Each period of the steam streams, preferably, follows a period of the flow of the air streams. When the generator is reversed, that is, when the movements of the air and the products of combustion through the regenerators 14 and 15 are reversed, the horizontal movement of the air from one port 56 towards a port 56 of an adjoining bridge 51 or wall 52 is reversed in direction. This may be followed by streams of steam in the succeeding period. Variations of the diagonal flow of air and steam and of horizontal streams of air and steam and variations in their sequence may be utilized to produce the desired results, that is, according to the character of the fuel and according to the condition of the ash, and according to the gases obtained. Also, mixtures of air and steam may be used during the steam or air blast periods.

The air or steam, or air and steam, or a mixture of air and steam, are directed through the fuel in different stages of operation within the generator laterally with respect to the side or sides of the generator. The generators shown in the drawings are rectangular in plan and, consequently, laterally or in a general lateral direction are broad terms to cover movements towards the sides, or the side of the generator or generator division. The terms laterally, or in a lateral direction includes the more specific terms "diagonally", and "horizontally". The streams are so directed as to carry the air or steam, or both, across the fuel bed or portions thereof as heretofore described, or specifically through the incandescent fuel, or as may be particularly pointed out in the specification and claims. The crossing or counter movement of the streams produces the desired results with reference to the maintenance of the reaction zone, and to the securing of efficient production of the gas or of a gas having a desired mixture of vapor and gas. As pointed out herein, the operation of the generator may be divided into four periods that repeat. However, changes may be made in the proportion and the quantity of the air or steam, and the length of time of each of the periods, and the sequence of the periods according to the effects produced in the generator. Ordinarily, the process would follow the repeated steps or cycles that are, as a matter of fact, divided into the said four periods in each step, preferably, follow the same order. First air may predominate and is directed through the generator or generator division toward the alternate wall or walls. This period of flow is followed by a period during which steam predominates and is directed toward the other wall or walls of the generator or division of the generator, that is, it is directed to the wall or walls located opposite the wall or walls toward which the air stream of the first period was directed. The third period is followed by a fourth period wherein steam may predominate and in which the paths are in the same general lateral direction to those in which the air of the third period was directed and in general laterally reverse direction to those in which the air and steam of the first and second periods were directed. The next step or cycle then begins with the first period and so on, the generator being operated through the succeeding periods.

To indicate the periods of flow, I have illustrated sections of each of the generators of Figs. 1 and 11 as being divided into three parts so as to designate the ports from and to which the gases flow within the generator, and have used arrows of different forms to indicate the distinct periods in which the gases, that is the air vapor and the reactive gases, flow. As shown in Fig. 7, the air flows from the ports 55 of alternate walls to the ports 56 of the intermediate walls during one period. This may be indicated by the arrows b. During a succeeding or subsequent period, air may be allowed to flow from the ports 55 of the said intermediate walls. During the said later period the air flows to the ports 56 of the walls having the ports 55 from which the air flowed in the earlier or preceding period. This may be indicated by the broken arrows c. There is thus produced drafts laterally extending in opposite directions and that cross each other during succeeding periods. During the periods of air flow, air may also be directed into the generator through the ports 56 located in the walls having the ports 55 through which air is directed into the generator during the same period. The air will flow from the ports 56 through which air is directed into the generator to the ports 56 of the intermediate walls and through which the air from the ports 55 also find their exit. This is true of both ports of draft and may be indicated by the solid arrows $b'$ and the broken arrows $c'$. There is thus produced, not only the downward and lateral draft, indicated by the arrows $b$ and $c$, but also the substantially horizontal and lateral drafts indicated by the arrows $b'$ and $c'$. The drafts of the first two ports are indicated in the two broken portions of the section of the generator that also show the side walls and an adjoining bridging wall. Two of the intermediate bridging walls included in one of the indicated broken parts of the generator, as illustrated in Fig. 7, have arrows indicating the steam blasting periods that may be used in the operation of the generator. Thus during a blasting period the steam may be admitted through the ports 55 and the reactive agents, together with the steam, may be drawn through the ports 56 through the alternate walls. This is indicated by the arrows marked $d$. During a succeeding or subsequent period, the steam flows through the ports 55 of the walls through which the steam was drawn in said earlier or preceding steam blasting period, and to the ports 56 in the walls from which the steam was directed through the ports 55 into the generator during the said earlier period. This may be indicated by the plurality of small arrows marked $e$. When the steam is flowing downwardly and laterally to the ports 56, of alternate walls, steam may also be admitted through the ports 56 of the intermediate walls and be drawn from the same ports 56 of the said alternate walls to produce a lateral movement of the steam in the same lateral direction that the diagonal moving steam moves during the same periods. This is indicated by the arrows $d'$ and $e'$. The flow along the line of the arrows $d'$ occurs in the same period that the steam flows along the line of the arrows $d$. Also, the flow of the steam along the line of the arrows $e'$ occurs during the same period that the steam flows along the line of the arrows $e$. If desired, the air flow periods may alternate with the steam flow periods, as, for example, the air flow along the paths indicated by arrows $b$ and $b'$ may be followed by a period of flow of steam along the paths indicated by the arrows $d$ and $d'$, and this may be followed by a flow of air along the paths indicated by the arrows $c$ and $c'$, which may form the third period. During the fourth period, the fuel may be steam blasted by movement of the steam along the paths of the air flow of the preceding period, that is, of the third period. The steam flow within the fourth period may be as indicated by the arrows $e$ and $e'$. This will then be followed by air draft, as indicated by the arrows $b$ and $b'$, and the cycle may then be, with variations, substantially repeated. As indicated above, the air and steam flow may be greatly varied. A mixture of air and steam may be directed through the ports 55, and also through the ports 56, or connections may be made so that air may be allowed to move through certain ports 55 into the generator in one wall and steam may be allowed to enter the generator through ports 55 of the same wall during the same period whereby there will be produced separate air streams and steam streams through the same wall and from ports of the same horizontal level in said wall. Variations of air and steam flow and quantities of air and steam flow in each period of variations of the lengths of the periods may be used according to the character of the fuel and the reactions that it is desired to obtain and for the proper economic control of the fuel during the operations of the generator.

In Fig. 14, I have indicated in like manner the different periods of steam and air flow by arrows similar in character to those used in Fig. 7 to indicate the different periods. Variations, however, may be utilized in producing the desired product of the reactions in the generator with maximum economy as pointed out in connection with the generator shown in Fig. 1.

In the form of construction shown in Figs. 15 and 16, a plurality of parallel bridging or partitioning walls are located in parallel relation to the side walls of the generator and extend from the ash pit upward to the fuel reservoir, the bridging or partitioning walls subdivide the interior of the generator into separate units with separate fuel charging hopper shaped spaces located at the upper ends of the units and separate and independently operated grates located at the lower ends of the units. This provides a more accurate control of the generator as a whole since the movement of the fuel in each unit is under the direct control of the operator.

As shown in Figs. 15 and 16, the walls 101 extend from the fuel chamber to the ash pit 102. The arrangement of the ports in the walls are the same as in the form of generator shown in Fig. 2, except that instead of being arranged arcuately, they extend substantially horizontally. Inasmuch as they perform the same functions, and the connections with them are arranged in the same manner, as in the form of generator shown in Fig. 2, they are marked with the same reference numbers as in the form of generator shown in Figs. 1, 2, and 3.

In the form of construction shown in Fig. 15, the walls are, preferably, provided with water cooling chambers or jackets 103 located along their lower ends and substantially in the plane of the grate bars which control the movement of the ash from each of the units formed by the walls. The cooling jackets 103 may be supported on I-beams 104 that extend across the top of the ash pit 102 and water may be directed through the jackets by means of pipes 109 connected to a source of water supply. The upper ends of the walls 101 are, preferably, formed to have substantially inclined surfaces 105 to direct the fuel from the fuel chamber into the space between the walls. Also, the lateral surfaces 106 of the walls are inclined downwardly and away from each other to produce a loosening of the material as it settles in each of the units. The ash, however, is held by the grate bars 107 which are located between the lower ends of the walls and the side walls of the generator, and, consequently, the control of the movement of the fuel, as well as of the ash, will be obtained, in a large degree, by the manipulation of the grate bars. The control of the fuel may also be obtained in a measure according to the process used in bringing about the reactions in the production of the desired products of the generator.

The ash pit 102 is made hopper-shaped and is sealed by a suitable door 110 that is located at the lower end of the hopper and is so disposed that the ash may be removed from the bottom of the hopper. The door 110 is substantially sealed tight by any suitable means, such as by means of a cross bar 111 that may extend across the outer side of the door 110 and be secured at its ends in a pair of brackets 112.

I claim:

1. In a gas generator having upright side walls enclosing and defining connected fuel preheating, gasifying and cooling chambers disposed one below the other in the form of a unitary vertical shaft, a gas induction passage ported out in the shaft at a point adjacent the vertical axis and between the side walls of the shaft, an independent gas eduction passage ported out in the shaft at a point spaced from both side walls and vertically and horizontally spaced below said gas induction port, and another gas eduction passage ported out in the shaft at a point vertically and horizontally spaced above said gas induction port.

2. In a gas generator having side walls located in opposite spaced relation defining a unitary gas generating chamber and a superposed connected fuel preheating chamber, two separately and independently controlled gas induction passages one of which is located in each of said side walls and both of which are ported out in the shaft at a plurality of points all in approximately the same horizontal plane, a gas eduction passage ported out in the shaft at a plurality of points all in a horizontal plane vertically spaced below all of the gas induction ports, another gas eduction passage ported out in the shaft at a plurality of points all in a horizontal plane vertically spaced above the gas induction ports, connections and valves whereby each of said gas induction passages and ports are operable interchangeably for the introduction of air and steam into the shaft, and connections and valves whereby said upper set of gas eduction ports are operable interchangeably for the introduction of steam into the shaft and for the removal of gas therefrom.

3. In a gas generator having opposite spaced side walls defining between them a gas generating chamber, a connected superposed fuel preheating chamber and an underlying connected ash quenching chamber, two bridge walls extending transversely through said gas generating chamber above the ash quenching chamber, each of said bridge walls being laterally spaced from the other and from the generator side walls, two gas induction passages, one in each of said bridge walls, ported out in the gas generating chamber in a horizontal plane approximately defining the top of the gas generating chamber, two gas eduction passages one in each of said bridge walls, ported out in the generator in a horizontal plane approximately defining the bottom of said gas generating chamber and vertically spaced from said gas induction ports, separate valved conduits connecting each of the gas induction passages with a source of air and with a source of steam, separate valved conduits connecting each of the gas eduction passages with a source of steam and with a gas outlet conduit, and means disposed in the ash quenching chamber for conducting a quenching fluid into the latter.

4. In a gas generator having spaced vertical side walls enclosing and defining connected fuel preheating, gasifying and cooling chambers disposed singly and successively one below the other in the form of a vertical shaft, the said shaft being laterally enlarged intermediate the ends of the shaft whereby the cross sectional area of the shaft is increased downwardly adjacent and below such intermediate portion of the shaft, two refractory aprons one of which depends vertically for a distance below each of said wall extensions and is spaced from the adjacent side wall, a gas inlet passage ported out in the shaft in the angle defined by one of said wall extensions and the inside of the adjacent refractory apron, and a gas outlet passage ported out in the shaft beneath the opposite wall extension and outside the adjacent refractory apron.

5. In a gas generator having spaced side walls enclosing and defining connected fuel preheating and gasifying chambers disposed singly and successively one below the other in the form of a vertical shaft, lateral wall extensions located in each of two opposite side walls, in a plane defining the top of the gasifying chamber, refractory aprons depending vertically below each of said wall extensions and horizontally spaced from the adjacent side wall and from the inner extremity of the corresponding wall extension, a gas inlet passage ported out in the shaft adjacent the base and on the inside of each of said aprons, and a gas outlet passage ported out in the shaft adjacent the lower extremity and on the outside of each of said aprons.

6. In a gas generator having spaced upright side walls enclosing and defining connected fuel preheating, gasifying and cooling chambers disposed singly and successively one below the other in the form of a vertical shaft, lateral wall extensions located in each of two opposite side walls in a plane defining the top of the gasifying chamber, an interchangeable gas outlet and steam inlet passage ported out in the fuel preheating chamber adjacent the longitudinal axis of the shaft, gas inlet passages ported out in the shaft immediately below each of said wall extensions, steam inlet passages ported out in the shaft at a point adjacent each of said gas inlet ports, interchangeable steam inlet and gas outlet passages ported out in the shaft at a point vertically spaced below each of said gas inlet passages, interchangeable gas inlet and gas offtake passages ported out in the shaft in opposite walls of the lower extremity of the gasifying chamber, and a water inlet ported out in the shaft in the charge cooling chamber.

7. In a gas generator having spaced side walls defining between them connected fuel preheating, gasifying and cooling chambers, successively disposed one below the other in the form of a unitary vertical shaft, two refractory bridges extending transversely across the gasifying chamber below the preheating chamber and above the cooling chamber, each of the said bridges being laterally spaced from the other and from the said side walls, two independent gas induction passages, one in each of the said bridges, and ported out in the shaft in approximately the same horizontal plane, two independent gas eduction passages, one in each of the said bridges, ported out in the shaft in a horizontal plane spaced below the said gas induction ports, a blast air conduit, a gas outlet conduit, valved conduits respectively connecting the blast air conduit with a corresponding one of the said gas induction passages, and valved conduits respectively connecting the said gas outlet conduit with a corresponding one of the gas eduction passages.

8. In a gas generator comprising a vertically disposed shaft having opposite spaced side walls enclosing and defining interconnected fuel preheating, gasifying and cooling chambers disposed successively one below the other and in permanent communication with each other, a gas induction passage ported out in the shaft at a point adjacent the intersection of the vertical axis of the shaft and the top of the gasifying chamber, and two independent valve-controlled gas eduction passages, each of which is ported out in the shaft adjacent one side wall, all of the said gas eduction ports being located in substantially a horizontal plane vertically spaced below the said gas induction port.

9. In a gas generator having side walls inclosing and defining connected fuel preheating, gasifying and cooling chambers disposed successively one below the other and in open communication with each other in the form of a unitary vertical shaft, an air induction passage ported out in the shaft at a point adjacent the top of the gasifying chamber, independent valve-controlled steam induction passages each ported out in the shaft at a plurality of points spaced above the air induction ports and laterally thereof, and separate valve-controlled gas eduction passages each ported out in the shaft at points substantially in the same horizontal plane and spaced below a corresponding air induction port and adjacent the lower margin of the gasifying chamber.

10. In a gas generator comprising a vertical shaft having opposite spaced side walls, two narrow refractory bridges extending transversely across the generator from two opposite spaced side walls at the mid portion of the generator shaft, each of the said bridges being laterally spaced from the other and from another pair of opposite side walls, two independent valve-controlled air induction passages, one in each of the said bridge walls, each ported out in the shaft through a plurality of ports all in approximately the same horizontal plane, two independent valve-controlled interchangeable steam induction and gas eduction passages, one in each of the said bridge walls and each ported out in the shaft in a horizontal plane spaced above the plane of the said air induction ports, and two separate valve-controlled interchangeable gas eduction and air induction passages, one in each of the said bridges and all of which are ported out in the shaft in a horizontal plane spaced below the plane of the said air induction ports.

11. In a gas generator having opposite spaced side walls enclosing and defining connected fuel preheating, gasifying and cooling chambers disposed successively one below the other and in free communication with each other in the form of a vertical shaft, a gas induction passage ported out in the shaft at a point adjacent the top of the gasifying chamber at approximately the vertical axis of the shaft, valve-controlled gas induction passages each ported out in the shaft at the opposite side walls adjacent the top of the gasifying chamber, gas eduction passages ported out in the shaft at points all spaced below the said gas induction ports, valve-controlled conduits connecting the respective gas induction passages with a source of air under pressure, and independent valve-controlled gas outlet conduits leading from each of the respective gas eduction passages.

12. In a gas generator having opposite spaced side walls inclosing and defining connected fuel preheating, gasifying and cooling chambers disposed successively one below the other and in open communication with each other and defining a unitary vertical shaft, a refractory member disposed approximately centrally of the shaft and in spaced relation with respect to two opposite side walls and supported by two other side walls, two gas induction passages, one of which is ported out downwardly in the shaft adjacent each of the said first mentioned walls, two gas eduction passages, one of which is ported out in the shaft adjacent each of the said side walls in a horizontal plane spaced below the plane of the gas induction ports, valve-controlled conduits connecting the respective gas induction passages with a source of air under pressure, independent valve-controlled gas outlet conduits leading from each of the respective gas eduction passages, and independent valve-controlled gas eduction passages within the said refractory member, each ported downwardly into the shaft at a horizontal level therein above that of the said gas induction passages.

13. In a gas generator comprising a vertical shaft, a gas eduction passage ported out downwardly in the shaft in the longitudinal mid-portion thereof at a point adjacent the vertical axis of the shaft, independent valve-controlled air induction passages each ported out in the shaft in one of the said side walls in a single horizontal plane vertically spaced below the plane of the said gas eduction port, a group of independent valve-controlled gas eduction passages, each ported out in one of the said side walls in the same horizontal plane vertically spaced below the plane of the said gas eduction port, a group of independent valve-controlled gas eduction passages each ported out in a corresponding one of the said side walls in the same horizontal plane spaced below the plane of the said air induction ports, and a water induction conduit ported out in the lower portion of the shaft below any of the said gas eduction and air induction ports.

14. Gas generating apparatus having in combination, a vertically-disposed gas generator shaft, a group of laterally-spaced bridge walls arranged in parallel therein and adapted longitudinally to divide an intermediate portion of the shaft into a plurality of narrow passageways, a second group of laterally-spaced bridge walls each member of which is disposed immediately below a corresponding one of the first-mentioned bridge walls, a downwardly opened passageway in each of the bridge walls, the passageways, in alternate bridge walls of each laterally-disposed group being in communication through a valve-controlled conduit with a source of air and with a source of steam, the remaining passageways of each group being in communication with said sources of air and steam through a second valve-controlled conduit, and valve-controlled means for selectively connecting with a gas outlet conduit the passageways in either set of the alternate bridge walls of the lowermost laterally-disposed group.

In witness whereof I have hereunto signed my name to this specification.

LOUIS B. MOORHOUSE.